United States Patent
Vareberg et al.

(10) Patent No.: US 11,989,541 B2
(45) Date of Patent: May 21, 2024

(54) DEPLOYMENT MIGRATION TOOL WITH DECODING CAPABILITIES

(71) Applicant: Target Brands, Inc., Minneapolis, MN (US)

(72) Inventors: Kent M. Vareberg, Chaska, MN (US); Michael C. Beckel, Anoka, MN (US)

(73) Assignee: Target Brands, Inc., Minneapolis, MN (US)

( * ) Notice: Subject to any disclaimer, the term of this patent is extended or adjusted under 35 U.S.C. 154(b) by 84 days.

(21) Appl. No.: 17/493,243

(22) Filed: Oct. 4, 2021

(65) Prior Publication Data
US 2023/0105023 A1    Apr. 6, 2023

(51) Int. Cl.
| G06F 9/44 | (2018.01) |
| G06F 8/60 | (2018.01) |
| G06F 8/61 | (2018.01) |
| G06F 9/445 | (2018.01) |
| G06F 9/455 | (2018.01) |

(52) U.S. Cl.
CPC . G06F 8/61 (2013.01); G06F 8/60 (2013.01)

(58) Field of Classification Search
CPC ..................................... G06F 8/61; G06F 8/60
See application file for complete search history.

(56) References Cited

U.S. PATENT DOCUMENTS

| 8,219,649 | B2 | 7/2012 | Ball |
| 8,302,092 | B2 * | 10/2012 | Alverson ................. G06F 8/61 |
| | | | 717/176 |
| 8,326,855 | B2 | 12/2012 | Chandra et al. |
| 8,745,577 | B2 | 6/2014 | Reech et al. |
| 9,251,183 | B2 | 2/2016 | Mandelstein et al. |
| 9,940,103 | B2 | 4/2018 | Berg et al. |
| 10,540,163 | B2 | 1/2020 | Prakash |
| 11,042,529 | B2 * | 6/2021 | Nguyen ................ G06F 16/219 |
| 11,093,641 | B1 * | 8/2021 | Whalen ................. G06F 16/906 |
| 11,157,253 | B1 * | 10/2021 | Shteyman ................ G06F 8/71 |
| 11,366,642 | B1 * | 6/2022 | Zega ..................... G06F 11/3664 |
| 11,546,217 | B1 * | 1/2023 | Vishwakarma ..... H04L 41/0866 |
| 11,573,779 | B2 * | 2/2023 | Vantipalli ................ G06F 8/63 |

(Continued)

FOREIGN PATENT DOCUMENTS

| CA | 3072907 | A1 * | 12/2020 | .......... G06F 11/1433 |
| CN | 111198726 | A  * | 5/2020 | |
| CN | 112463301 | A  * | 3/2021 | |

OTHER PUBLICATIONS

Miklós Kálmán, Enhanced XML Validation Using SRML, 2013, pp. 1-18. https://arxiv.org/ftp/arxiv/papers/1311/1311.4040.pdf (Year: 2013).*

(Continued)

Primary Examiner — Mongbao Nguyen
(74) Attorney, Agent, or Firm — Theodore M. Magee; Westman, Champlin & Koehler, P.A.

(57) ABSTRACT

A computer-implemented method includes a processor decoding a first document output by a first deployment tool to construct a deployment parameter missing from a deployment validation rule in the first document. The processor creates a second document using the constructed deployment parameter and submits the second document to a second deployment tool to load the deployment validation rule into the second deployment tool.

9 Claims, 22 Drawing Sheets

(56) References Cited

U.S. PATENT DOCUMENTS

| | | | | |
|---|---|---|---|---|
| 2008/0306986 | A1* | 12/2008 | Doyle, Sr. | G06F 8/51 |
| | | | | 717/136 |
| 2012/0221684 | A1* | 8/2012 | Ferris | H04L 67/56 |
| | | | | 709/217 |
| 2016/0098287 | A1 | 4/2016 | Prasad et al. | |
| 2017/0339251 | A1 | 11/2017 | Jagannath et al. | |
| 2018/0039648 | A1* | 2/2018 | Han | G06F 16/219 |
| 2019/0171438 | A1* | 6/2019 | Franchitti | G06N 20/00 |
| 2019/0235850 | A1* | 8/2019 | Mukherjee | G06F 8/71 |
| 2019/0303212 | A1 | 10/2019 | Bosch et al. | |
| 2020/0186441 | A1 | 6/2020 | Fitzer et al. | |
| 2020/0327371 | A1* | 10/2020 | Sharma | G06N 3/08 |
| 2020/0401382 | A1* | 12/2020 | Briggs | G06F 8/60 |
| 2021/0064262 | A1* | 3/2021 | Myers | G06F 11/1466 |
| 2021/0224122 | A1* | 7/2021 | Glass | H04L 67/1031 |
| 2022/0083502 | A1* | 3/2022 | Bestfleisch | G06F 16/901 |
| 2022/0229957 | A1* | 7/2022 | Venugopal | G06N 3/088 |
| 2022/0237025 | A1* | 7/2022 | Bregman | G06F 9/5016 |
| 2022/0391541 | A1* | 12/2022 | Novotny | G06F 8/41 |
| 2023/0021723 | A1* | 1/2023 | Karuppannan | H04L 63/0263 |
| 2023/0023025 | A1* | 1/2023 | Shetty | G06F 16/214 |
| 2023/0029624 | A1* | 2/2023 | Olejarz | G06F 21/577 |

OTHER PUBLICATIONS

Damien Doligez, Avoiding Security Pitfalls with Functional Programming: a Report on the Development of a Secure XML Validator, 2015, pp. 1-10. https://dl.acm.org/doi/pdf/10.5555/2819009.2819040 (Year: 2015).*

Mojtaba Shahin, Continuous Integration, Delivery and Deployment: A Systematic Review on Approaches, Tools, Challenges and Practices, 2017, pp. 3909-3942. https://ieeexplore.ieee.org/stamp/stamp.jsp?tp=&arnumber=7884954 (Year: 2017).*

AWS, Accelerating your Migration to AWS, 2021, pp. 1-4. https://aws.amazon.com/blogs/architecture/accelerating-your-migration-to-aws/ (Year: 2021).*

Bellendorf et al., Specification of cloud topologies and orchestration using TOSCA: A Survey, Computing manuscript, pp. 1-23, Retrieved at http://www.cs.bme.hu/~manusz/publications/Computing-2019/Bellendorf_Mann_Computing_2019.pdf, 2019.

* cited by examiner

SCCM Deployment Type Detection Method Body XML:

```xml
<?xml version="1.0" encoding="utf-16"?>
<EnhancedDetectionMethod xmlns="http://schemas.microsoft.com/SystemCenterConfigurationManager/2009/AppMgmtDigest">
  <Settings xmlns="http://schemas.microsoft.com/SystemCenterConfigurationManager/2009/AppMgmtDigest">
    <MSI LogicalName="MSI_09c1a89f-eac5-42d6-84a9-dce20f5750eb" IsPerUser="false"
xmlns="http://schemas.microsoft.com/SystemCenterConfigurationManager/2009/07/10/DesiredConfiguration">
      <Annotation xmlns="http://schemas.microsoft.com/SystemCenterConfigurationManager/2009/06/14/Rules">
        <DisplayName Text="" />
        <Description Text="" />
      </Annotation>
      <ProductCode>{5E7383E5-1F7F-4812-BB7A-77629F12861D}</ProductCode>
    </MSI>
  </Settings>
  <Rule id="ScopeId_031A7AD4-7851-4C8B-A2D6-A4FF96C61716/DeploymentType_f983f07c-abd3-4f4a-bfd9-aaad53b9b5ef" Severity="Informational" NonCompliantWhenSettingIsNotFound="false"
xmlns="http://schemas.microsoft.com/SystemCenterConfigurationManager/2009/06/14/Rules">
    <Annotation>
      <DisplayName Text="" />
      <Description Text="" />
    </Annotation>
    <Expression>
      <Operator>NotEquals</Operator>
      <Operands>
        <SettingReference AuthoringScopeId="ScopeId_031A7AD4-7851-4C8B-A2D6-A4FF96C61716"
LogicalName="Application_972c69be-0e47-4b86-a426-c270f223b74b" Version="2" DataType="Int64"
SettingLogicalName="MSI_09c1a89f-eac5-42d6-84a9-dce20f5750eb" SettingSourceType="MSI"
Method="Count" Changeable="false" />
        <ConstantValue Value="0" DataType="Int64" />
      </Operands>
    </Expression>
  </Rule>
</EnhancedDetectionMethod>
```

FIG. 4

Tanium Deploy Install Verification Generated JSON:

```
{
    "andFlag": false,
    "subGroups": [
        {
            "filter": {
                "field": "registry_key",
                "value": "HKEY_LOCAL_MACHINE\\SOFTWARE\\WOW6432Node\\Microsoft\\Windows\\CurrentVersion\\Uninstall\\{5E7383E5-1F7F-4812-BB7A-77629F12861D}",
                "operator": "exist"
            }
        },
        {
            "filter": {
                "field": "registry_key",
                "value": "HKEY_LOCAL_MACHINE\\SOFTWARE\\Microsoft\\Windows\\CurrentVersion\\Uninstall\\{5E7383E5-1F7F-4812-BB7A-77629F12861D}",
                "operator": "exist"
            }
        }
    ]
}
```

FIG. 5

SCCM Deployment Type Detection Method Body XML:

```xml
<?xml version="1.0" encoding="utf-16"?>
<EnhancedDetectionMethod xmlns="http://schemas.microsoft.com/SystemCenterConfigurationManager/2009/AppMgmtDigest">
  <Settings xmlns="http://schemas.microsoft.com/SystemCenterConfigurationManager/2009/AppMgmtDigest">
    <MSI LogicalName="MSI_094967cb-d863-4e32-a1b0-a50e33520417" IsPerUser="false" xmlns="http://schemas.microsoft.com/SystemCenterConfigurationManager/2009/07/10/DesiredConfiguration">
      <Annotation xmlns="http://schemas.microsoft.com/SystemCenterConfigurationManager/2009/06/14/Rules">
        <DisplayName Text="" />
        <Description Text="" />
      </Annotation>
      <ProductCode>{E1AA8B0F-1176-36F1-8A91-AA19CF39C2F6}</ProductCode>
    </MSI>
    <File Is64Bit="false" LogicalName="File_ab9cc7b9-7df8-46f9-81c6-c5a6edc03799" xmlns="http://schemas.microsoft.com/SystemCenterConfigurationManager/2009/07/10/DesiredConfiguration">
      <Annotation xmlns="http://schemas.microsoft.com/SystemCenterConfigurationManager/2009/06/14/Rules">
        <DisplayName Text="" />
        <Description Text="" />
      </Annotation>
      <Path>%ProgramFiles(x86)%\Google\Chrome\Application</Path>
      <Filter>chrome.exe</Filter>
    </File>
  </Settings>
  <Rule id="ScopeId_2C682F43-1B1D-4231-A1CB-B8301BEB8467/DeploymentType_756d2426-86f5-4736-b2e6-ca455bd19ff6" Severity="Informational" NonCompliantWhenSettingIsNotFound="false" xmlns="http://schemas.microsoft.com/SystemCenterConfigurationManager/2009/06/14/Rules">
    <Annotation>
      <DisplayName Text="" />
      <Description Text="" />
    </Annotation>
    <Expression>
      <Operator>Or</Operator>
      <Operands>
        <Expression>
          <Operator>NotEquals</Operator>
          <Operands>
            <SettingReference AuthoringScopeId="ScopeId_2C682F43-1B1D-4231-A1CB-B8301BEB8467" LogicalName="Application_927491ff1-8662-4f2a-9b18-8fa9eccb0b63" Version="1" DataType="Int64" SettingLogicalName="MSI_094967cb-d863-4e32-a1b0-a50e33520417" SettingSourceType="MSI" Method="Count" Changeable="false" />
            <ConstantValue Value="0" DataType="Int64" />
          </Operands>
        </Expression>
        <Expression>
          <Operator>NotEquals</Operator>
          <Operands>
            <SettingReference AuthoringScopeId="ScopeId_2C682F43-1B1D-4231-A1CB-B8301BEB8467" LogicalName="Application_927491ff1-8662-4f2a-9b18-8fa9eccb0b63" Version="1" DataType="Int64" SettingLogicalName="File_ab9cc7b9-7df8-46f9-81c6-c5a6edc03799" SettingSourceType="File" Method="Count" Changeable="false" />
            <ConstantValue Value="0" DataType="Int64" />
          </Operands>
        </Expression>
      </Operands>
    </Expression>
  </Rule>
</EnhancedDetectionMethod>
```

FIG. 7

Tanium Deploy Install Verification Generated JSON:

```
{
    "andFlag": false,                                    802
    "subGroups": [
        {                                                808
            "andFlag": false,
            "subGroups": [
                {                                        816  820
                    "filter": {
                        "field": "registry_key",
                        "value":
"HKEY_LOCAL_MACHINE\\SOFTWARE\\WOW6432Node\\Microsoft\\Windows\\CurrentVersion\\
Uninstall\\{E1AA8B0F-1176-36F1-8A91-AA19CF39C2F6}",
                        "operator": "exist"              828  822
                    }
                },
                {
                    "filter": {
                        "field": "registry_key",
                        "value":
"HKEY_LOCAL_MACHINE\\SOFTWARE\\Microsoft\\Windows\\CurrentVersion\\Uninstall\\{E1AA8B0F-
1176-36F1-8A91-AA19CF39C2F6}",
                        "operator": "exist"              830
                    }
                }
            ]
        },
        {
            "andFlag": false,
            "subGroups": [
                {                                        854
                    "filter": {
                        "field": "file_path",
                        "value": "||PROGRAMFILES32BIT||\\Google\\Chrome\\Application\\
chrome.exe",
                        "operator": "exist"              860
                    }
                },
                {
                    ...
                }
            ]
        }
    ]
}
```

FIG. 8

SCCM Deployment Type Detection Method Body XML:

```xml
<?xml version="1.0" encoding="utf-16"?>
<EnhancedDetectionMethod xmlns="http://schemas.microsoft.com/SystemCenterConfigurationManager/2009/AppMgmtDigest">
  <Settings xmlns="http://schemas.microsoft.com/SystemCenterConfigurationManager/2009/AppMgmtDigest">
    <SimpleSetting LogicalName="RegSetting_70732054-6fb1-44fa-9bfa-ec3eb1c06b44" DataType="String" xmlns="http://schemas.microsoft.com/SystemCenterConfigurationManager/2009/07/10/DesiredConfiguration">
      <Annotation xmlns="http://schemas.microsoft.com/SystemsCenterConfigurationManager/2009/06/14/Rules">
        <DisplayName Text="" />
        <Description Text="" />
      </Annotation>
      <RegistryDiscoverySource Hive="HKEY_LOCAL_MACHINE" Depth="Base" Is64Bit="false" CreateMissingPath="true">
        <Key>SOFTWARE\Microsoft\Windows\CurrentVersion\Uninstall\{718BA81E-A95C-4112-86A1-40F0FE8BDE9E}</Key>
        <ValueName>DisplayVersion</ValueName>
      </RegistryDiscoverySource>
    </SimpleSetting>
    <SimpleSetting LogicalName="RegSetting_0b9ff5c2-0aef-4a23-ab64-66560a053b90" DataType="String" xmlns="http://schemas.microsoft.com/SystemCenterConfigurationManager/2009/07/10/DesiredConfiguration">
      <Annotation xmlns="http://schemas.microsoft.com/SystemsCenterConfigurationManager/2009/06/14/Rules">
        <DisplayName Text="" />
        <Description Text="" />
      </Annotation>
      <RegistryDiscoverySource Hive="HKEY_LOCAL_MACHINE" Depth="Base" Is64Bit="false" CreateMissingPath="true">
        <Key>SOFTWARE\Microsoft\Windows\CurrentVersion\Uninstall\{718BA81E-A95C-4112-86A1-40F0FE8BDE9E}</Key>
        <ValueName>DisplayVersion</ValueName>
      </RegistryDiscoverySource>
    </SimpleSetting>
  </Settings>
</Settings>
```

FIG. 10(a)

```xml
<Rule id="ScopeId_2C682F43-1B1D-4231-A1CB-B8301BEB8467/DeploymentType_12524125-a904-492a-9878-dabb9ed78da0" Severity="Informational" NonCompliantWhenSettingIsNotFound="false" xmlns="http://schemas.microsoft.com/SystemsCenterConfigurationManager/2009/06/14/Rules">
    <Annotation>
        <DisplayName Text="" />
        <Description Text="" />
    </Annotation>
    <Expression>
        <Operator>Or</Operator>
        <Operands>
            <Expression>
                <Operator>Equals</Operator>
                <Operands>
                    <SettingReference AuthoringScopeId="ScopeId_2C682F43-1B1D-4231-A1CB-B8301BEB8467" LogicalName="Application_006583be-09a3-442b-b5d1-9dbbe650187c" Version="1" DataType="String" SettingLogicalName="RegSetting_70732054-6fb1-44fa-9bfa-ec3eb1c06b44" SettingSourceType="Registry" Method="Value" Changeable="false" />
                    <ConstantValue Value="7.20.00.117" DataType="String" />
                </Operands>
            </Expression>
            <Operator>Equals</Operator>
            <Operands>
                <SettingReference AuthoringScopeId="ScopeId_2C682F43-1B1D-4231-A1CB-B8301BEB8467" LogicalName="Application_006583be-09a3-442b-b5d1-9dbbe650187c" Version="2" DataType="String" SettingLogicalName="RegSetting_0b9ff5c2-0aef-4a23-ab64-66560a053b90" SettingSourceType="Registry" Method="Value" Changeable="false" />
                <ConstantValue Value="7.20.110.9" DataType="String" />
            </Operands>
        </Operands>
    </Expression>
</Rule>
</EnhancedDetectionMethod>
```

FIG. 10(b)

Tanium Deploy Install Verification Generated JSON:

```
{
    "andFlag": false,
    "subGroups": [
        {
            "andFlag": false,
            "subGroups": [
                {
                    "filter": {
                        "field": "registry_key",
                        "value":
"HKEY_LOCAL_MACHINE\\SOFTWARE\\WOW6432Node\\Microsoft\\Windows\\CurrentVersion\\Uninstall\\{718BA81E-A95C-4112-86A1-40F0FE8BDE9E}\\DisplayVersion",
                        "operator": "eq",
                        "secondValue": "7.20.00.117"
                    }
                },
                {
                    "filter": {
                        "field": "registry_key",
                        "value":
"HKEY_LOCAL_MACHINE\\SOFTWARE\\Microsoft\\Windows\\CurrentVersion\\Uninstall\\{718BA81E-A95C-4112-86A1-40F0FE8BDE9E}\\DisplayVersion",
                        "operator": "eq",
                        "secondValue": "7.20.00.117"
                    }
                }
            ]
        },
        {
            "andFlag": false,
            "subGroups": [
                {
                    "filter": {
                        "field": "registry_key",
                        "value":
```

FIG. 11(a)

```
"HKEY_LOCAL_MACHINE\\SOFTWARE\\WOW6432Node\\Microsoft\\Windows\\CurrentVersion\\Uninstall\\
{718BA81E-A95C-4112-86A1-40F0FE8BDE9E}\\DisplayVersion",
            "operator": "eq",
            "secondValue": "7.20.110.9"
        }
    ]},
    { "filter": {
        "field": "registry_key",
        "value":
"HKEY_LOCAL_MACHINE\\SOFTWARE\\Microsoft\\Windows\\CurrentVersion\\Uninstall\\{718BA81E-
A95C-4112-86A1-40F0FE8BDE9E}\\DisplayVersion",
            "operator": "eq",
            "secondValue": "7.20.110.9"
        }
    ]
}
```

FIG. 11(b)

SCCM Deployment Type Detection Method Body XML #1:

```
<?xml version="1.0" encoding="utf-16"?>
<EnhancedDetectionMethod xmlns="http://schemas.microsoft.com/SystemCenterConfigurationManager/
2009/AppMgmtDigest">
  <Settings xmlns="http://schemas.microsoft.com/SystemCenterConfigurationManager/2009/
AppMgmtDigest">
    <Folder Is64Bit="false" LogicalName="Folder_739dbc6f-f33c-4de7-a63e-c036477d8535"
xmlns="http://schemas.microsoft.com/SystemCenterConfigurationManager/2009/07/10/
DesiredConfiguration">
      <Annotation xmlns="http://schemas.microsoft.com/SystemsCenterConfigurationManager/2009/06/
14/Rules">
        <DisplayName Text="" />
        <Description Text="" />
      </Annotation>
      <Path>C:\ProgramData\Microsoft\Windows\Start Menu\Programs</Path>
      <Filter>Oracle - OraClient11g_home2</Filter>
    </Folder>
    <Folder Is64Bit="false" LogicalName="Folder_d13eae0a-8c30-4f94-af14-677e97e85629"
xmlns="http://schemas.microsoft.com/SystemCenterConfigurationManager/2009/07/10/
DesiredConfiguration">
      <Annotation xmlns="http://schemas.microsoft.com/SystemsCenterConfigurationManager/2009/06/
14/Rules">
        <DisplayName Text="" />
        <Description Text="" />
      </Annotation>
      <Path>C:\ProgramData\Microsoft\Windows\Start Menu\Programs</Path>
      <Filter>Oracle - OraClient11g_home1</Filter>
    </Folder>
    <SimpleSetting LogicalName="RegSetting_032c3cb4-33c4-4739-b545-c192bf83bc4e" DataType="String"
xmlns="http://schemas.microsoft.com/SystemCenterConfigurationManager/2009/07/10/
DesiredConfiguration">
      <Annotation xmlns="http://schemas.microsoft.com/SystemsCenterConfigurationManager/2009/06/
14/Rules">
        <DisplayName Text="" />
        <Description Text="" />
      </Annotation>
      <RegistryDiscoverySource Hive="HKEY_LOCAL_MACHINE" Depth="Base" Is64Bit="true"
CreateMissingPath="true">
        <Key>SOFTWARE\Target\Oracle11g_x64</Key>
        <ValueName>DisplayName</ValueName>
      </RegistryDiscoverySource>
    </SimpleSetting>
  </Settings>
```

FIG. 13A

```
<Rule id="Rule_525e2b58-ccfc-4310-b1cc-425f7adc8abe" Severity="Informational"            ← 1302
 NonCompliantWhenSettingIsNotFound="false" xmlns="http://schemas.microsoft.com/
 SystemsCenterConfigurationManager/2009/06/14/Rules">
  <Annotation>
    <DisplayName Text="" />
    <Description Text="" />                              ← 1304
  </Annotation>
  <Expression>                                           ← 1306
    <Operator>And</Operator>                             ← 1308
    <Operands>                                           ← 1310
      <Expression>
        <Operator>NotEquals</Operator>                   ← 1316
        <Operands>                                       ← 1314
          <SettingReference AuthoringScopeId="ScopeId_031A7AD4-7851-4C8B-A2D6-A4FF96C61716"
           LogicalName="Application_6lbe168b-5940-4efb-801e-311f2ae5e5bc" Version="1" DataType="Int64"
           SettingLogicalName="Folder_739dbc6f-f33c-4de7-a63e-c0364774B535" SettingSourceType="Folder"
           Method="Count" Changeable="true" />                            ← 1316
            <ConstantValue Value="0" DataType="Int64" />                  ← 1318
        </Operands>
      </Expression>
      <Expression>
        <Operator>Equals</Operator>                      ← 1332
        <Operands>                                       ← 1336
          <SettingReference AuthoringScopeId="ScopeId_2C682F43-1B1D-4231-A1CB-B8301BEB8467"
           LogicalName="Application_0bb621b8-b089-430a-a0f8-e452568af6bd" Version="1" DataType="String"
           SettingLogicalName="RegSetting_032c3cb4-33c4-4739-b545-c192bf83bc4e" SettingSourceType="Registry"
           Method="Value" Changeable="false" />                           ← 1338
            <ConstantValue Value="Oracle11g2Client_x64" DataType="string" />   ← 1352
        </Operands>                                      ← 1356
      </Expression>
      <Operator>NotEquals</Operator>                     ← 1358
      <Operands>                                         ← 1362
        <SettingReference AuthoringScopeId="ScopeId_031A7AD4-7851-4C8B-A2D6-A4FF96C61716"
         LogicalName="Application_6lbe168b-5940-4efb-801e-311f2ae5e5bc" Version="1" DataType="Int64"
         SettingLogicalName="Folder_d13eae0a-8c30-4f94-af14-677e97e85629" SettingSourceType="Folder"
         Method="Count" Changeable="true" />                              ← 1364
          <ConstantValue Value="0" DataType="Int64" />                    ← 1366
      </Operands>
    </Expression>
  </Rule>
</EnhancedDetectionMethod>
```

FIG. 13B

Tanium Deploy Install Verification Generated JSON #1:

```
{
    "andFlag": true,
    "subGroups": [
        {
            "andFlag": false,
            "subGroups": [
                {
                    "filter": {
                        "field": "file_path",
                        "value": "C:\\ProgramData\\Microsoft\\Windows\\Start Menu\\Programs\\Oracle - OraClient11g_home2",
                        "operator": "exist"
                    }
                }
            ]
        },
        {
            "andFlag": false,
            "subGroups": [
                {
                    "filter": {
                        "field": "registry_key",
                        "value": "HKEY_LOCAL_MACHINE\\SOFTWARE\\Target\\Oracle11g_x64\\DisplayName",
                        "operator": "eq",
                        "secondValue": "Oracle11g2Client_x64"
                    }
                }
            ]
        },
        {
            "andFlag": false,
            "subGroups": [
                {
                    "filter": {
                        "field": "file_path",
                        "value": "C:\\ProgramData\\Microsoft\\Windows\\Start Menu\\Programs\\Oracle - OraClient11g_home1",
                        "operator": "exist"
                    }
                }
            ]
        }
    ]
}
```

FIG. 14

SCCM Deployment Type Detection Method Body XML:

```
<?xml version="1.0" encoding="utf-16"?>
<EnhancedDetectionMethod xmlns="http://schemas.microsoft.com/
SystemCenterConfigurationManager/2009/AppMgmtDigest">
    <Settings xmlns="http://schemas.microsoft.com/SystemCenterConfigurationManager/2009/
AppMgmtDigest">
        <MSI LogicalName="MSI_2cdef58b-0650-484b-ae50-337486e3ebb9" IsPerUser="false"
xmlns="http://schemas.microsoft.com/SystemCenterConfigurationManager/2009/07/10/
DesiredConfiguration">
            <Annotation xmlns="http://schemas.microsoft.com/SystemsCenterConfigurationManager/
2009/06/14/Rules">
                <DisplayName Text="" />
                <Description Text="" />
            </Annotation>
            <ProductCode>{7952AC6D-315A-4791-BDE3-0976D6E0AD72}</ProductCode>
        </MSI>
    </Settings>
    <Rule id="ScopeId_2C682F43-1B1D-4231-A1CB-B8301BEB8467/DeploymentType_71fcdf9d-cf60-
4184-b683-f25e7d04d778" Severity="Informational" NonCompliantWhenSettingIsNotFound="false"
xmlns="http://schemas.microsoft.com/SystemsCenterConfigurationManager/2009/06/14/Rules">
        <Annotation>
            <DisplayName Text="" />
            <Description Text="" />
        </Annotation>
        <Expression>
            <Operator>Equals</Operator>
            <Operands>
                <SettingReference AuthoringScopeId="ScopeId_2C682F43-1B1D-4231-A1CB-
B8301BEB8467" LogicalName="Application_cd4a1b31-d5ad-460b-9d46-24ddea7922f1" Version="1"
DataType="Version" SettingLogicalName="MSI_2cde58b-0650-484b-ae50-337486e3ebb9"
SettingSourceType="MSI" Method="Value" PropertyPath="ProductVersion" Changeable="false" />
                <ConstantValue Value="5.00.8239.1000" DataType="Version" />
            </Operands>
        </Expression>
        <Expression>
            <Operator>NotEquals</Operator>
            <Operands>
                <SettingReference AuthoringScopeId="ScopeId_2C5BF7BD-56F1-4221-9080-
04BF15D160A7" LogicalName="Application_186c07a8-fefe-40ff-b7d2-6b0c8864eaf8" Version="2"
DataType="Int64" SettingLogicalName="File_d491500-0d00-45c1-ab43-af5316d7a112"
SettingSourceType="File" Method="Count" Changeable="false" />
                <ConstantValue Value="0" DataType="Int64" />
            </Operands>
        </Expression>
```

FIG. 16

Tanium Deploy Install Verification Generated JSON:

```
{
    "andFlag": false,
    "subGroups": [
        {
            "filter": {
                "field": "registry_key",
                "value": "HKEY_LOCAL_MACHINE\\SOFTWARE\\WOW6432Node\\Microsoft\\Windows\\CurrentVersion\\Uninstall\\{7952AC6D-315A-4791-BDE3-0976D6E0AD72}\\DisplayVersion",
                "operator": "eq",
                "secondValue": "5.00.8239.1000"
            }
        },
        {
            "filter": {
                "field": "registry_key",
                "value": "HKEY_LOCAL_MACHINE\\SOFTWARE\\Microsoft\\Windows\\CurrentVersion\\Uninstall\\{7952AC6D-315A-4791-BDE3-0976D6E0AD72}\\DisplayVersion",
                "operator": "eq",
                "secondValue": "5.00.8239.1000"
            }
        }
    ]
}
```

DEPLOYMENT MIGRATION TOOL WITH DECODING CAPABILITIES

BACKGROUND

Deployment tools provide user interfaces that receive parameters describing when, where and how applications are to be deployed to devices. At an application's scheduled deployment time, the deployment tool triggers the deployment of the application to the devices set for the application. This can involve sending files representing the application to a device or sending an instruction to a client running on the device that causes the client to retrieve and load files representing the application. Once the application has been deployed, the deployment tool often verifies the deployment using one or more deployment rules that look for expected changes in the device due to the deployment.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes a processor decoding a first document output by a first deployment tool to construct a deployment parameter missing from a deployment validation rule in the first document. The processor creates a second document using the constructed deployment parameter and submits the second document to a second deployment tool to load the deployment validation rule into the second deployment tool.

In accordance with a further embodiment, a system includes a first deployment tool having stored therein deployment settings for a plurality of applications, wherein the deployment settings comprise deployment validation rules and a migration tool. The migration tool receives a first document from the first deployment tool that describes a deployment validation rule for an application in a format that encodes a portion of the deployment validation rule. The migration tool applies decoding rules to the encoded portion of the deployment validation rule to decode a parameter of the deployment validation rule and writes the parameter of the deployment validation rule to a second document. The migration tool uploads the second document to a second deployment tool to load the validation rule for the application into the second deployment tool.

In accordance with a still further embodiment, a method includes receiving encoded deployment parameters for an application in a first format from a first deployment tool used to deploy the application to devices. The encoded deployment parameters are decoded and the decoded deployment parameters are written in a second format and uploaded to a second deployment tool used to deploy the application to devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is an example of a document output by a first deployment tool that includes an encoded description of an installer package deployment validation.

FIG. 5 is an example of a second document to be uploaded to a second deployment tool during the migration of FIG. 3.

FIG. 7 is an example of a document output by a first deployment tool that includes an encoded description of a combination of an installer package deployment validation with a file path validation.

FIG. 8 is an example of a second document to be uploaded to a second deployment tool during the migration of FIG. 6.

FIG. 10($a$) is an example of a first portion of a document output by a first deployment tool that includes an encoded description of the deployment validation rule.

FIG. 10($b$) is an example of a second portion of the document of FIG. 10($a$).

FIG. 11($a$) is an example of a first portion of a second document to be uploaded to a second deployment tool during the migration of FIG. 9.

FIG. 11($b$) is an example of a second portion of the document of FIG. 11($a$).

FIG. 12($b$) provides a second portion of the flow diagram of FIG. 12($a$).

FIG. 13($a$) is an example of a first portion of a document output by a first deployment tool that includes an encoded description of the deployment validation rule of FIG. 12.

FIG. 13($b$) is an example of a second portion of the document of FIG. 13($b$).

FIG. 14 is an example of a second document to be uploaded to a second deployment tool as part of the migration of FIG. 12.

FIG. 16 is an example of a document output by a first deployment tool that includes an encoded version validation rule.

FIG. 17 is an example of a second document to be uploaded to a second deployment tool as part of the migration of FIG. 15.

DETAILED DESCRIPTION

Some deployment tools do not share how their deployment parameters are stored or how those deployment parameters are used. While it is possible to obtain some deployment attributes from such tools, the attributes are often obscured or encoded in the output provided by the deployment tool. In addition, the formats used by different deployment tools differ from each other. As a result of the obscuring and different formats, it is difficult to switch or migrate from using one deployment tool to using another deployment tool because the deployment parameters must be re-entered by hand in the new deployment tool.

The embodiments described below decode an output produced by one deployment tool to identify deployment parameters for an application. These deployment parameters are then automatically rewritten in a format required by a second deployment tool and are loaded into the second deployment tool.

Figure 1:
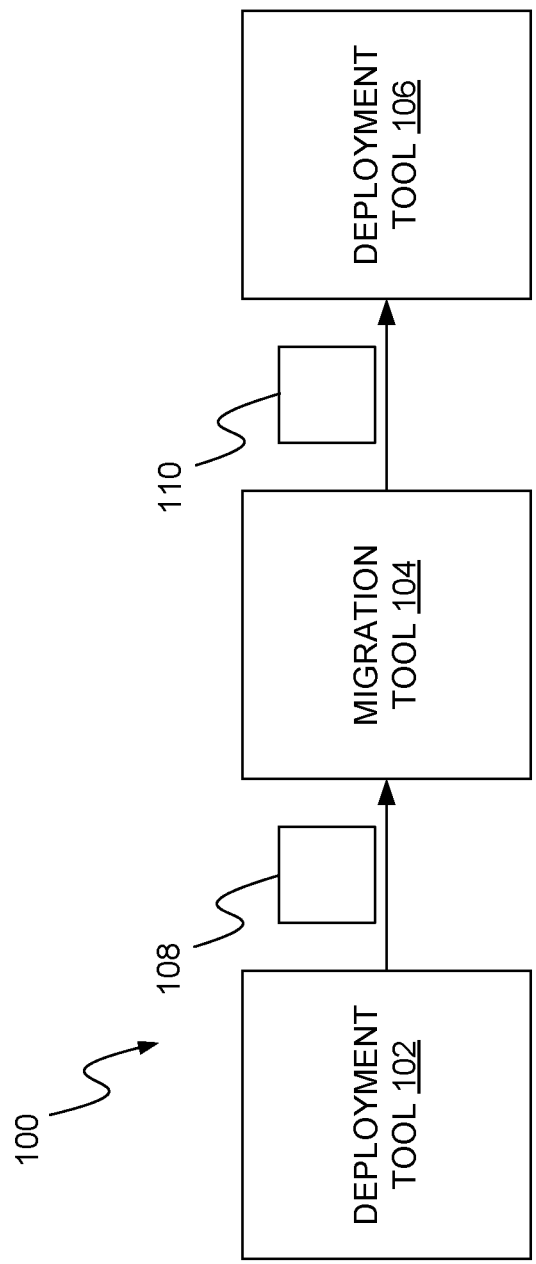
FIG. 1 block diagram of system for migrating deployment parameters.
Figure 2:
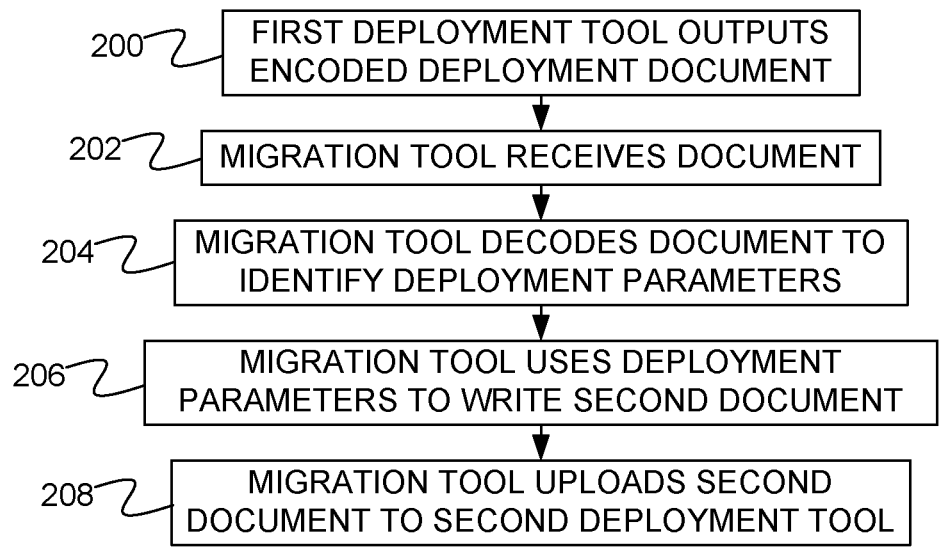
FIG. 2 flow diagram of a method of migrating deployment parameters from one deployment tool to another deployment tool.

FIG. 1 provides a block diagram of a migration system 100 that migrates deployment parameters for a plurality of applications from a first deployment tool 102 to a second deployment tool 106 using a migration tool 104, where first deployment tool 102, second deployment tool 106 and migration tool 104 are software modules executed by processors. FIG. 2 provides a method of migrating deployment parameters using migration system 100.

In step 200, first deployment tool 102 outputs a document 108 containing deployment parameters for deploying at least one application. At least some of the deployment parameters are encoded in document 108 such that it is not clear from document 108 what steps are to be performed for at least one aspect of the deployment of the application. In particular, at least one aspect of deployment validation steps are encoded or obscured in document 108.

At step 202, migration tool 104 receives document 108. At step 204, migration tool 104 decodes document 108 to identify deployment parameters for the application. In accordance with some embodiments, this decoding involves decoding what steps are necessary to validate a deployment for an application. At step 206, migration tool 104 uses the identified deployment parameters to write a second document 110 for second deployment tool 106. In accordance with some embodiments, second deployment tool 106 requires the parameters to be in a format that is different from the format of document 108. At step 208, migration tool 104 uploads document 108 to second deployment tool 106 to install the deployment parameters in second deployment tool 106.

Figure 3:
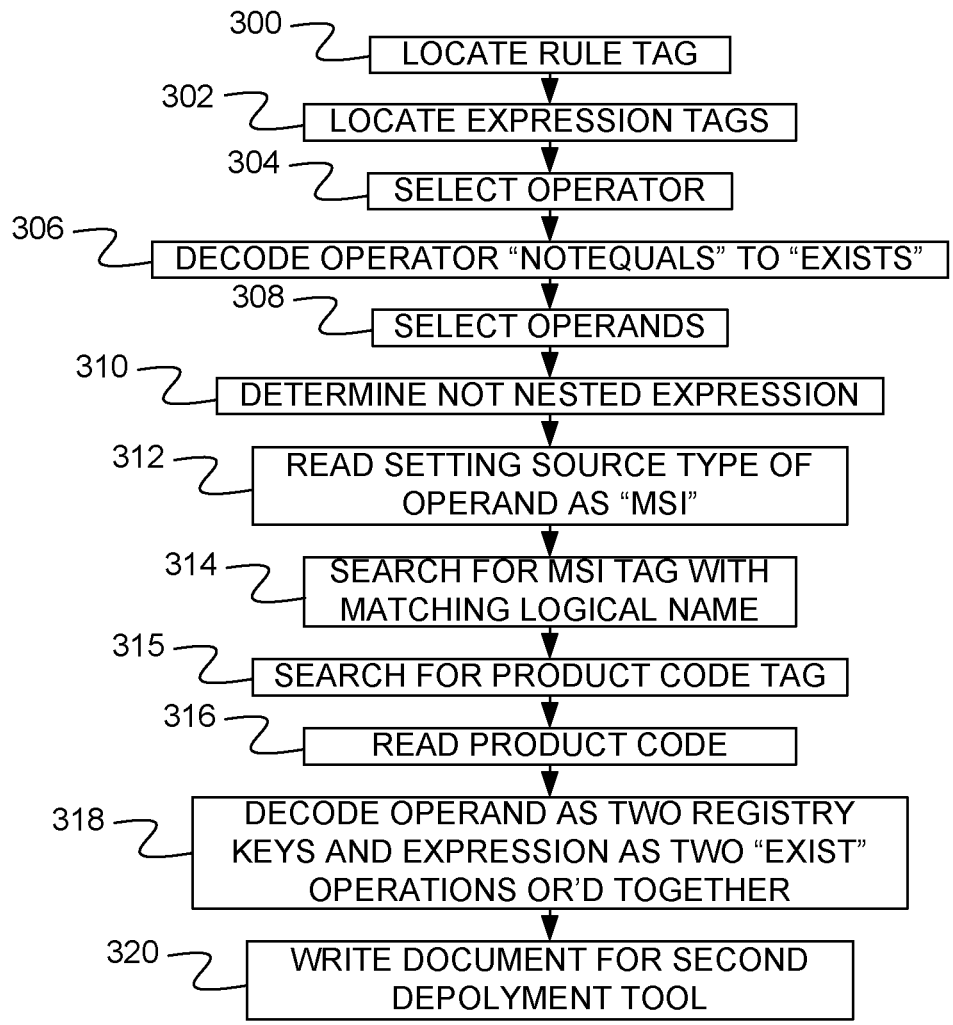
FIG. 3 is a flow diagram of a method of migrating an encoded installer package deployment validation.

FIG. 3 provides a flow diagram of a method executed by migration tool 104 for decoding a deployment validation rule in a first document 400 (FIG. 4) provided by first deployment tool 102. The deployment validation rule validates a deployment by determining whether at least one of two registry keys is present after the deployment. The decoded information is used by migration tool 104 to write a second document 500 (FIG. 5) in a format needed by second deployment tool 106.

In step 300, migration tool 104 locates a rule tag 402 in document 400. At step 302, migration tool 104 locates an expression tag 404 delimited by rule tag 402. At step 304, migration tool 104 selects an operator 406 delimited by expression tag 404. At step 306, migration tool 104 decodes operator 406. In particular, migration tool 104 decodes the operator "NotEquals" as the operator "Exists".

At step 308, migration tool 104 selects operand 410 delimited by operands tag 408 and determines that operand 410 is not a nested expression at step 310. In particular, migration tool 104 determines that operand 410 is not an Expression tag.

At step 312, migration tool 104 determines the value of a SettingSourceType attribute 412 of operand 410. In particular, migration tool 104 determines that attribute 412 is set to "MSI". Based on this determination, migration tool 104 searches for an MSI tag 416 that contains a LogicalName attribute 418 with a value that matches the value of a SettingLogicalName attribute 414 in operand 410 at step 314. At step 315, migration tool 104 searches for Product-Code tags 419 delimited by MSI tag 416. At step 316, migration tool 104 reads the corresponding product code 420 delimited by ProductCode tag 419.

At step 318, migration tool 104 decodes operand 410 as involving two registry keys:

HKEY_LOCAL_MACHINE\\SOFTWARE\\Microsoft\\Windows\\CurrentVersion\\Uninstall\\{5E73-83E5-1F7F-4812-BB7A-77629F12861D}; and HKEY_LOCAL_MACHINE\\SOFTWARE\\Microsoft\\Windows\\CurrentVersion\\Uninstall\\{5E7383E5-1F7F-4812-BB7A-77629F12861D} where the end of each key is product code 420.

Migration tool 104 also decodes expression 404 as a Boolean OR of an EXISTS operation for the first registry key and an EXISTS operation for the second registry key. Note that document 400 does not indicate that expression 404 represents a Boolean OR operation, does not indicate that expression 404 represents a registry key validation, and does not indicate that expression 404 represents two registry key EXISTS validations. As such, during decoding of document 400, migration tool 104 must construct deployment parameters missing from document 400 including the registry keys, the EXISTS operations and the Boolean OR operation, for example.

At step 320, migration tool 104 writes the validation rule represented by document 400 as document 500, which is in the correct format for second deployment tool 106. In document 500, the logical OR operation of expression 404 is represented by the key/value pair "andFlag": false 502. The operands of the Boolean OR of expression 404 are written as subgroups 503 and 505 within "subgroups" key 504 and each represent a separate registry key validation. Subgroups 503 and 505 include respective "filter" keys 506 and 508, which both use a respective "field" key 510, 512 to indicate that this is a registry key validation, a respective "value" key 514, 516 to designate the respective registry key, and a respective "operator" key 518, 520 to indicate that the existence of the registry key is being tested.

Figure 6:
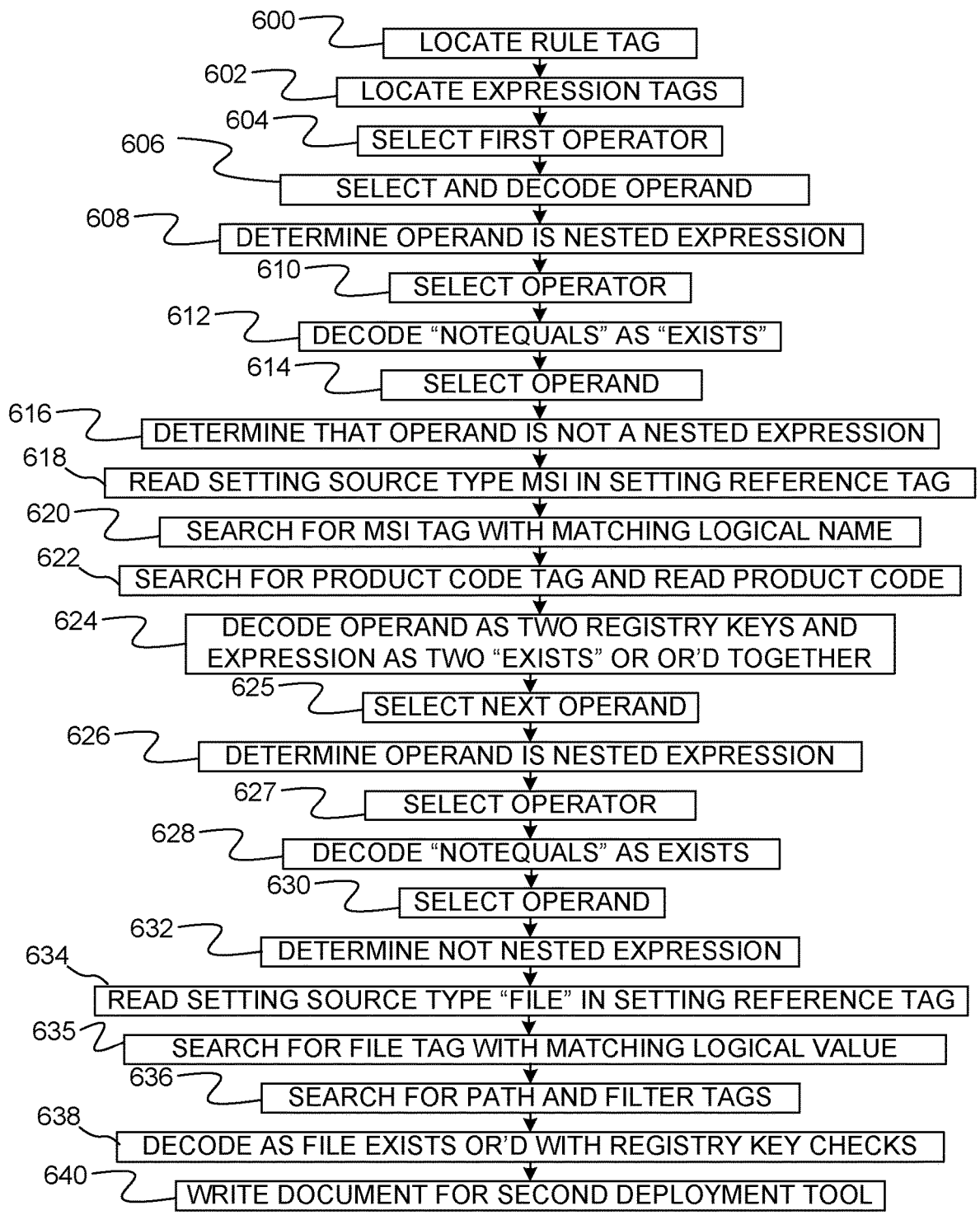
FIG. 6 is a flow diagram of a method of migrating an encoded combination of an installer package deployment validation with a file path validation.

FIG. 6 provides a flow diagram of a method executed by migration tool 104 for decoding a second deployment validation rule in a first document 700 (FIG. 7) provided by first deployment tool 102. The deployment validation rule validates a deployment by determining whether at least one of two registry keys is present after the deployment or a file is present after the deployment. The decoded information is used by migration tool 104 to write a second document 800 (FIG. 8) in a format needed by second deployment tool 102.

In step 600, migration tool 104 locates a rule tag 702 in document 700. A step 602, migration tool 104 locates an expression tag 704 delimited by rule tag 702. At step 604, migration tool 104 selects and decodes an operator 706 delimited by expression tag 704. In particular, OR operator 706 is decoded as a Boolean OR. At step 606, migration tool 104 selects an operand 710 delimited by operands 708 and determines that operand 710 is a nested expression at step 608.

At step 610, migration tool 104 selects operator 712 in operand 710. At step 612, migration tool 104 decodes operator 712. In particular, migration tool 104 decodes "NotEquals" operator 712 as an EXISTS operator.

At step 614, migration tool 104 selects operand 716 delimited by operands 714 and determines that operand 716 is not a nested expression at step 616. In particular, migration tool 104 determines that operand 716 is not an expression tag.

At step 618, migration tool 104 determines the value of a SettingSourceType attribute 718 of operand 716. In particular, migration tool 104 determines that attribute 718 is set to "MSI". Based on this determination, migration tool 104 searches for an MSI tag 722 that contains a LogicalName attribute 724 having a value that matches the value of a SettingLogicalName attribute 720 in operand 716 at step 620. At step 622, migration tool 104 searches for a ProductCode tag 721 delimited by MSI tag 722 and reads the corresponding product code 726 delimited by ProductCode tag 721.

At step 624, migration tool 104 decodes operand 716 as involving two registry keys:
HKEY_LOCAL_MACHINE\\SOFTWARE\\WOW643-2Node\\Microsoft\\Windows\\CurrentVersion\\Uninstall\\{E1AA8B0E-1176-36F1-8A91-AA19CF39C-2F6}; and
HKEY_LOCAL_MACHINE\\SOFTWARE\\Microsoft\\Windows\\CurrentVersion\\Uninstall\\{E1AA-8B0F-1176-36F1-8A91-AA19CF39C2F6}
where the end of each key is product code 726.

Migration tool 104 also decodes operand/expression 710 as a logical OR of an EXISTS operation for the first registry key and an EXISTS operation for the second registry key. Note that document 700 does not indicate that operand 710 represents a logical OR operation, does not indicate that operand 710 represents a registry key validation, and does not indicate that operand 710 represents two registry key EXISTS validations. Thus, document 700 encodes or obscures the data validation rule. As such, during decoding of document 700, migration tool 104 must construct deployment parameters missing from document 700 including the registry keys, the EXISTS operations and the Boolean OR operation, for example.

At step 625, migration tool 104 selects operand 727 of operands 708 and at step 626 determines that operand 727 is a nested expression. At step 627, migration tool 104 selects operator 728 of operand 727 and at step 628, migration tool 104 decodes "NotEquals" operator 728 as an EXISTS operator.

At step 630, migration tool 104 selects operand 734 of operands 730 and determines that operand 734 is not a nested expression at step 632.

At step 634, migration tool 104 determines the value of a SettingSourceType attribute 732 of the operand 734. In particular, migration tool 104 determines that attribute 732 is set to "FILE". Based on this determination, migration tool 104 searches for a FILE tag 740 that contains a LogicalName attribute 742 having a value that matches the value of a SettingLogicalName attribute 736 in operand 734 step 635. At step 636, migration tool 104 searches for a Path tag 744 and a Filter tag 746 delimited by FILE tag 740 and reads the corresponding path 748 and filter value 750.

At step 638, migration tool 104 decodes operand/expression 727 as a File Exists validation and expression 706 is decoded as a Boolean OR of the File Exists validation of operand 727 and the result of the Boolean OR of the two registry key validations from operand 710.

At step 640, a document 800 of FIG. 8 is written that includes the validation rules decoded from document 700 re-written in a format required by second deployment tool 106. In particular, the Boolean OR of expression 706 is written as key/value pair "andFlag": false 802, the two registry key validations are written within a subgroup 804 and the File Exists validation is written in a subgroup 806. The OR of expression 710 is written as key/value pair "andFlag": false 808. The operands of the OR of expression 710 are written as subgroups 810 and 812 within "subgroups" key 814 and each represent a separate registry key validation. Subgroups 810 and 812 include respective "filter" keys 816 and 818, which both use a respective "field" key 820, 822 to indicate that this is a registry key validation, a respective "value" key 824, 826 to designate the respective registry key, and a respective "operator" key 828, 830 to indicate that the existence of the registry key is being tested. The File Exists validation is represented in subgroup 806 and includes a "subgroups" key 850 with a single subgroup 852. Subgroup 852 includes a "filter" key 854, a "field" key 856 that indicates that this is a file path validation, a "value" key 858 that indicates the file path, and an "operator" key 860 that indicates that the validation rule is to determine whether the file represented by the path exists.

Figure 9:
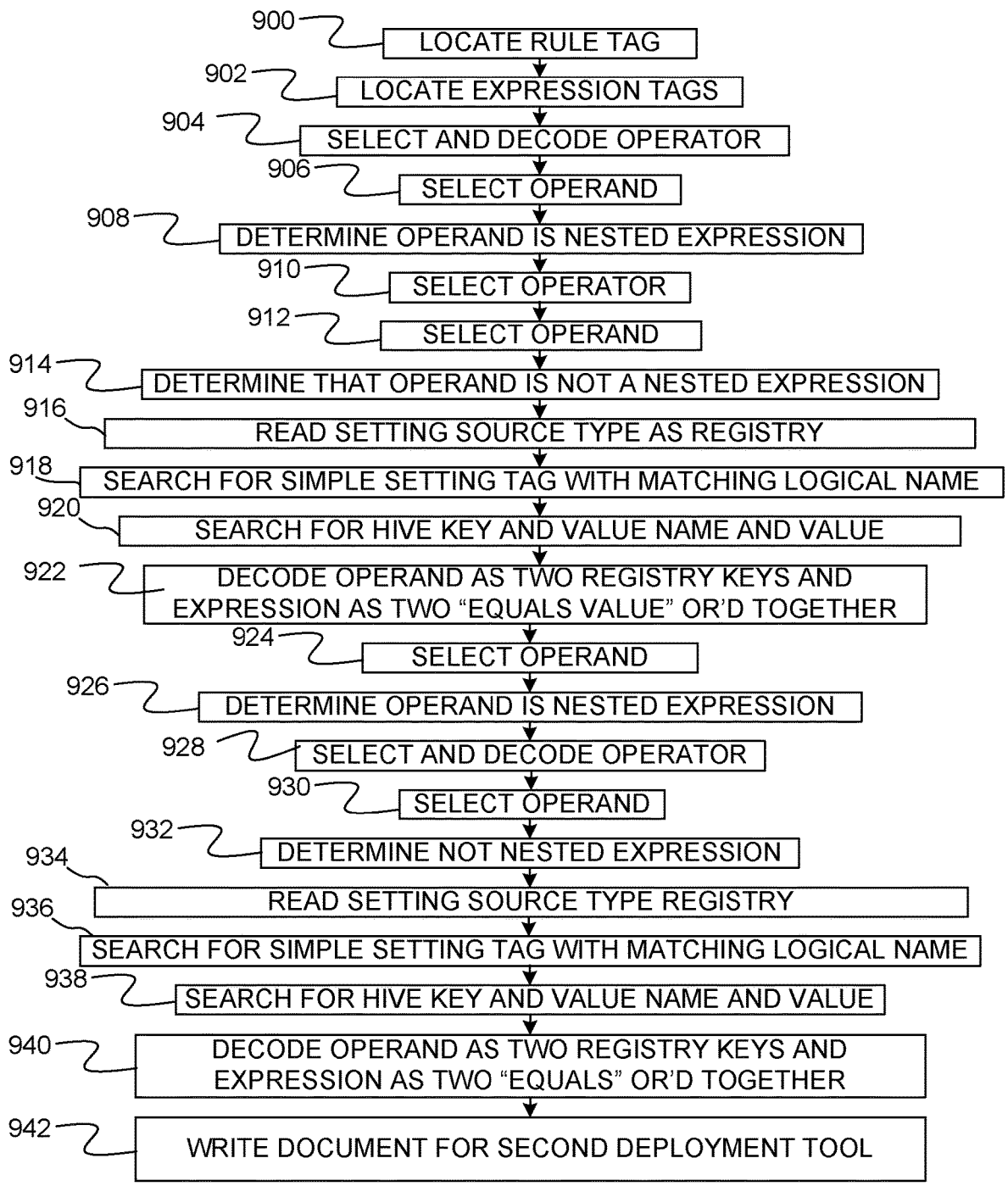
FIG. 9 is a flow diagram of a method of migrating a deployment validation rule that encodes a determination of whether a first registry key has one of two possible values or whether a second registry key has one of the two possible values.

FIG. 9 provides a flow diagram of a method executed by migration tool 104 for decoding a third deployment validation rule in a first document 1000 (FIGS. 10(a) and 10(b)) provided by first deployment tool 102. The deployment validation rule validates a deployment by determining whether a first registry key has one of two possible values or whether a second registry key has one of the two possible values. The decoded information is used by migration tool 104 to write a second document 1100 (FIGS. 11(a) and 11(b)) in a format required by second deployment tool 102.

In step 900, migration tool 104 locates a rule tag 1002 in document 1000 (FIG. 10(b)). At step 902, migration tool 104 locates an expression tag 1004 delimited by rule tag 1002. At step 904, migration tool 104 selects an operator 1005 in expression tag 1004 and decodes the operator as a Boolean OR operator. At step 906, migration tool 104 selects operand 1006 in operands 1007 and determines that operand 1006 is a nested expression at step 908.

At step 910, migration tool 104 selects operator 1008 in operand 1006 and decodes operator 1008 as an Equals operator. At step 912, migration tool 104 selects operand 1010 of operands 1011 and determines that operand 1010 is not a nested expression at step 914. In particular, migration tool 104 determines that operand 1010 is not an expression tag.

At step 916, migration tool 104 determines the value of a SettingSourceType attribute 1012 of operand 1010. In particular, migration tool 104 determines that attribute 1012 is set to "Registry". Based on this determination, migration tool 104 searches for a SimpleSetting tag 1014 (FIG. 10(a)) that contains a LogicalName attribute 1015 having a value that matches the value of a SettingLogicalName attribute 1013 in operand 1010 at step 918. At step 920, migration tool 104 searches for a Hive attribute 1016 of a RegistryDiscoverySource tag, a key tag 1017 and a valuename tag 1018 delimited by SimpleSetting tag 1014 and searches for a value attribute 1020 of a ConstantValue tag 1021 delimited by operands tags 1011.

At step 922, migration tool 104 decodes operand/expression 1006 as the Boolean OR of two registry key Equals expressions. In particular, the registry keys of the registry key Equals expressions are built from hive attribute 1016, key tag 1017 and valuename tag 1018 as:
Hive\\Key1\\ValueName; and
Hive\\Key2\\ValueName
where Key2 is the key read from key tag 1017 and Key1 is a modified version of the key read from key tag 1017 with WOW6432Node inserted in the path of the key. For the example of FIGS. 10(a) and 10(b), registry keys would be:
HKEY_LOCAL_MACHINE\\SOFTWARE\\WOW64-32Node\\Microsoft\\Windows\\CurrentVersion\\Uninstall\\{718BA81E-A95C-4112-86A1-40F0FE8BDE-9E}\\DisplayVersion; and HKEY_LOCAL_MACHINE\\SOFTWARE\\Wicrosoft\\Windows\\CurrentVersion\\Uninstall\\{718BA-81E-A95C-4112-86A1-40F0FE8BDE9E}\\DisplayVersion.

Operand/expression 1006 is then decoded as the Boolean OR of two Equals expressions involving these two keys. Specifically:

HKEY_LOCAL_MACHINE\\SOFTWARE\\WOW64-32Node\\Microsoft\\Windows\\CurrentVersion\\Uninstall\\{718BA81E-A95C-4112-86A1-40F0FE8BD-E9E}\\DisplayVersion EQUALS 7.20.00.117; and HKEY_LOCAL_MACHINE\\SOFTWARE\\Microsoft\\Windows\\CurrentVersion\\Uninstall\\{718BA-81EA95C-4112-86A1-40F0FE8BDE9E}\\DisplayVersion EQUALS 7.20.00.117.

At step 924, migration tool 104 selects operand 1022 in operands 1007 and determines that operand 1022 is a nested expression at step 926.

At step 928, migration tool 104 selects operator 1024 in operand 1006 and decodes operator 1024 as an Equals operator. At step 930, migration tool 104 selects operand 1026 of operands 1027 and determines that operand 1026 is not a nested expression at step 932. In particular, migration tool 104 determines that operand 1026 is not an expression tag.

At step 934, migration tool 104 determines the value of the SettingSourceType attribute 1040 of operand 1026. In particular, migration tool 104 determines that attribute 1040 is set to "Registry". Based on this determination, migration tool 104 searches for a SimpleSetting tag 1028 that contains a LogicalName attribute 1029 having a value that matches the value of a SettingLogicalName attribute 1042 in operand 1026 at step 936. At step 938, migration tool 104 searches for a Hive attribute 1031 of a RegistryDiscoverySource tag 1030, a key tag 1032 and a valuename tag 1034 delimited by SimpleSetting tag 1028 and searches for a value attribute 1036 of a ConstantValue tag 1037 delimited by operands tags 1027.

At step 940, migration tool 104 decodes operand/expression 1022 as the Boolean OR of two registry key Equals expressions. In particular, the registry keys of the registry key Equals expressions are built from hive attribute 1031, key tag 1032 and valuename tag 1034 as:

Hive\\Key1\\ValueName; and

Hive\\Key2\\ValueName where Key2 is the key read from key tag 1032 and Key1 is a modified version of the key read from key tag 1032 with WOW6432Node inserted in the path of the key. For the example of FIG. 10, the registry keys would be:

HKEY_LOCAL_MACHINE\\SOFTWARE\\WOW643-2Node\\Microsoft\\Windows\\CurrentVersion\\Uninstall\\{718BA81E-A95C-4112-86A1-40F0FE8BD-E9E}\\DisplayVersion; and HKEY_LOCAL_MACHINE\\SOFTWARE\\Microsoft\\Windows\\CurrentVersion\\Uninstall\\{718B-A81E-A95C-4112-86A1-40F0FE8BDE-9E}\\DisplayVersion.

Operand/expression 1022 is then decoded as the Boolean OR of two Equals expressions involving these two keys. Specifically:

HKEY_LOCAL_MACHINE\\SOFTWARE\\WOW64-32Node\\Microsoft\\Windows\\CurrentVersion\\Uninstall\\{718BA81E-A95C-4112-86A1-40F0FE8BD-E9E}\\DisplayVersion EQUALS 7.20.110.9; and HKEY_LOCAL_MACHINE\\SOFTWARE\\Microsoft\\Windows\\CurrentVersion\\Uninstall\\{718BA81-EA95C-4112-86A140F0FE8BDE9E}\\DisplayVersion EQUALS 7.20.110.9.

Note that Key1 discussed above is missing from document 1000. As such, during decoding of document 1000, migration tool 104 must construct deployment parameters missing from document 1000 including some of the registry keys, for example.

At step 942, a document 1100 of FIGS. 11(*a*) and 11(*b*) is written that includes the validation rules decoded from document 1000 re-written in a format required by second deployment tool 106. In particular, the Boolean OR of expression 1004 is written as key/value pair "andFlag": false 1101, the two registry-key-value-EQUALS-7.20.00.117 expressions are written within a subgroup 1102 and the two registry-key-value-EQUALS-7.20.110.9 expressions are written within a subgroup 1104 of "subgroups" key 1105.

Within subgroup 1102, the OR of expression 1006 is written as key/value pair "andFlag": false 1106. The operands of the OR of expression 1006 are written as subgroups 1108 and 1110 within "subgroups" key 1111 and each represent a separate registry-key-EQUALS-value validation. Subgroups 1108 and 1110 include respective "filter" keys 1112 and 1122, which both use a respective "field" key 1114, 1124 to indicate that this is a registry key validation, a respective "value" key 1116, 1126 to designate the respective registry key, a respective "operator" key 1118, 1128 to indicate that an Equals operation is being performed, and a respective "secondValue" key 1120, 1130 that provides the value that the registry key value is to be compared to during the Equals operation.

Within subgroup 1104, the OR of expression 1022 is written as key/value pair "andFlag": false 1131. The operands of the OR of expression 1022 are written as subgroups 1132 and 1134 within "subgroups" key 1135 and each represent a separate registry-key-EQUALS-value validation. Subgroups 1132 and 1134 include respective "filter" keys 1136 and 1146, which both use a respective "field" key 1138, 1148 to indicate that this is a registry key validation, a respective "value" key 1140, 1150 to designate the respective registry key, a respective "operator" key 1142, 1152 to indicate that an Equals operation is being performed, and a respective "secondValue" key 1144, 1154 that provides the value that the registry key value is to be compared to during the Equals operation.

Figure 12A:
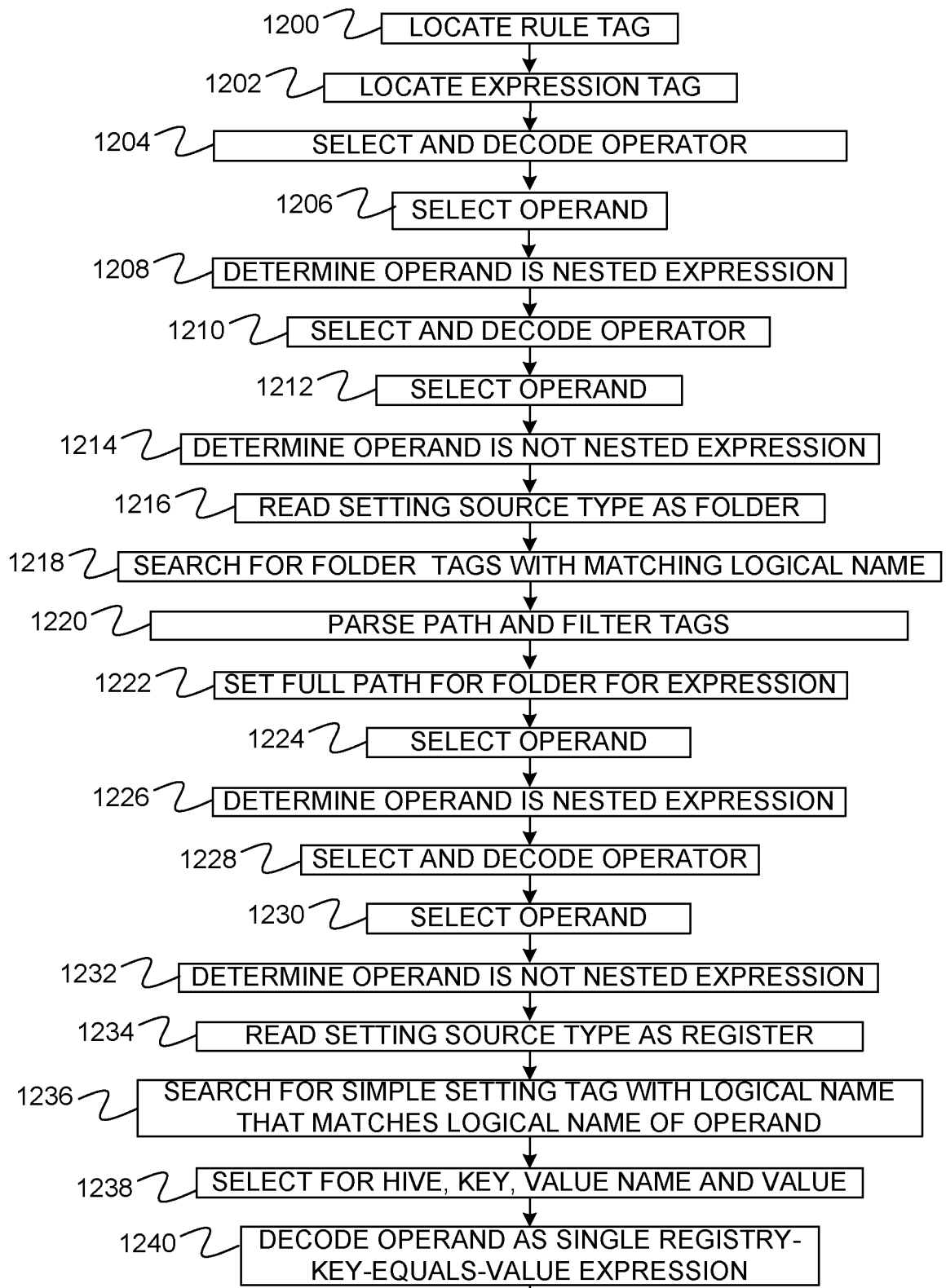
FIG. 12($a$) provides a first portion of a flow diagram of a method of migrating a deployment validation rule encodes file existence and a registry-key-equals-value validation.
Figure 12B:
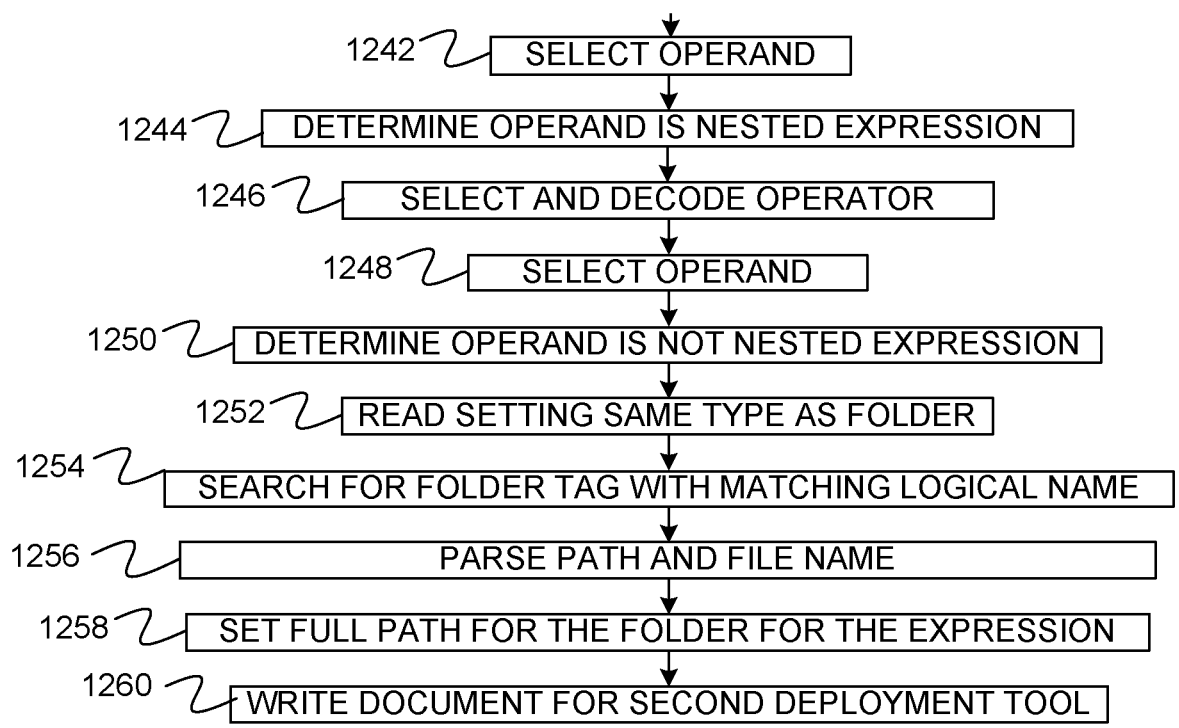

FIGS. 12(*a*) and 12(*b*) provide a flow diagram of a method executed by migration tool 104 for decoding a third deployment validation rule in a first document 1300 (FIGS. 13(*a*) and 13(*b*)) provided by first deployment tool 102. The deployment validation rule validates a deployment by determining whether two folders exist on the device and whether a registry key has a particular value. The decoded information is used by migration tool 104 to write a second document 1400 (FIG. 14) in a format required by second deployment tool 102.

In step 1200, migration tool 104 locates a rule tag 1302 in document 1300 (FIG. 13(*b*)). At step 1202, migration tool 104 locates an expression tag 1304 delimited by rule tag 1302. At step 1204, migration tool 104 selects an operator 1306 delimited by expression tag 1304 and decodes the operator as a Boolean AND operator. At step 1206, migration tool 104 selects operand 1308 in operands 1310 and determines that operand 1308 is a nested expression at step 1208.

At step 1210, migration tool 104 selects operator 1312 in operand 1308 and decodes "NotEquals" operator 1312 as an Exists operator. At step 1212, migration tool 104 selects operand 1314 of operands 1316 and determines that operand 1314 is not a nested expression at step 1214. In particular, migration tool 104 determines that operand 1314 is not an expression tag.

At step 1216, migration tool 104 determines the value of the SettingSourceType attribute 1316 of operand 1314. In particular, migration tool 104 determines that attribute 1316 is set to "Folder". Based on this determination, migration tool 104 searches for a Folder tag 1320 (FIG. 13(*a*)) that contains a LogicalName attribute 1322 having a value that matches the value of a SettingLogicalName attribute 1318 in operand 1314 at step 1218. At step 1220, migration tool 104 parses a Path tag 1323 and a Filter tag 1325 delimited by Folder tag 1320. At step 1222, migration tool 104 sets a full path for a folder by concatenating the value in Filter tag 1325 to the end of the value in Path tag 1323.

At step 1224, migration tool 104 selects operand 1330 in operands 1310 and determines that operand 1330 is a nested expression at step 1226.

At step 1228, migration tool 104 selects operator 1332 in operand 1330 and decodes operator 1332 as an Equals operator. At step 1230, migration tool 104 selects operand 1334 of operands 1336 and determines that operand 1334 is not a nested expression at step 1232. In particular, migration tool 104 determines that operand 1334 is not an expression tag.

At step 1234, migration tool 104 determines the value of the SettingSourceType attribute 1336 of operand 1334. In particular, migration tool 104 determines that attribute 1336 is set to "Registry". Based on this determination, migration tool 104 searches for a SimpleSetting tag 1340 that contains a LogicalName attribute 1342 having a value that matches the value of a SettingLogicalName attribute 1338 in operand 1334 at step 1236. At step 1238, migration tool 104 searches for a Hive attribute 1344 of a RegistryDiscoverySource tag 1346, a key tag 1348 and a valuename tag 1350 delimited by SimpleSetting tag 1340 and searches for a value attribute 1352 of a ConstantValue tag 1354 delimited by operands tags 1336.

At step 1240, migration tool 104 decodes operand 1334 as a registry-key-EQUALS-value expression. In particular, the registry key of the expression is built from hive attribute 1344, key tag 1348 and valuename tag 1350 as: Hive\\Key\\ValueName. For the example of FIG. 13, the registry key would be:

HKEY_LOCAL_MACHINE\\SOFTWARE\\Target\\
   Oraclellg_x64\\DisplayName and the expression for operand 1334 would be:

HKEY_LOCAL_MACHINE\\SOFTWARE\\Target\\
   Oraclellg_x64\\DisplayName EQUALS Oraclellg2Client_X64

At step 1242, migration tool 104 selects operand 1356 in operands 1310 and determines that operand 1356 is a nested expression at step 1244.

At step 1246, migration tool 104 selects operator 1358 in operand 1356 and decodes "NotEquals" operator 1358 as an Exists operator. At step 1248, migration tool 104 selects operand 1360 of operands 1362 and determines that operand 1360 is not a nested expression at step 1250. In particular, migration tool 104 determines that operand 1360 is not an expression tag.

At step 1252, migration tool 104 determines the value of the SettingSourceType attribute 1364 of operand 1360. In particular, migration tool 104 determines that attribute 1364 is set to "Folder". Based on this determination, migration tool 104 searches for a Folder tag 1368 that contains a LogicalName attribute 1370 having a value that matches the value of a SettingLogicalName attribute 1366 in operand 1360 at step 1254. At step 1256, migration tool 104 parses a Path tag 1372 and a Filter tag 1374 delimited by Folder tag 1368. At step 1258, migration tool 104 sets a full path for a folder by concatenating the value in Filter tag 1374 to the end of the value in Path tag 1372.

Note that the EXISTS operator discussed above is missing from document 1300. Instead, a "NotEquals" operator is used in document 1300. As such, during decoding of document 1300, migration tool 104 must construct deployment parameters missing from document 1300 including one of the operators, for example.

At step 1260, a document 1400 of FIG. 14 is written that includes the validation rules decoded from document 1300 re-written in a format required by second deployment tool 106. In particular, the Boolean AND of expression 1304 is written as key/value pair "andFlag": true 1402, the folder Exists expression of operand 1308 is written in a subgroup 1404, the registry-key-EQUALS-value expression of operand 1330 is written in a subgroup 1406, and the folder Exists expression of operand 1356 is written in subgroup 1408.

Within subgroup 1404, there is a "subgroups" key 1410 with a single subgroup 1412. Subgroup 1412 includes a "filter" key 1414, a "field" key 1416 that indicates that this is a file path validation, a "value" key 1418 that indicates the file path, and an "operator" key 1420 that indicates that the validation rule is to determine whether the file represented by the path exists.

Within subgroup 1406, there is a "subgroups" key 1420 with a single subgroup 1422. Subgroup 1422 includes a "filter" key 1424, a "field" key 1426 that indicates that this is a registry key validation, a "value" key 1428 that indicates the registry key, an "operator" key 1430 that indicates that the validation rule is to determine whether the registry key equals a value, and the "secondValue" key 1432 that provides the value that the registery key must equal.

Within subgroup 1408, there is a "subgroups" key 1434 with a single subgroup 1436. Subgroup 1436 includes a "filter" key 1438, a "field" key 1440 that indicates that this is a file path validation, a "value" key 1442 that indicates the file path, and an "operator" key 1444 that indicates that the validation rule is to determine whether the file represented by the path exists.

Figure 15:
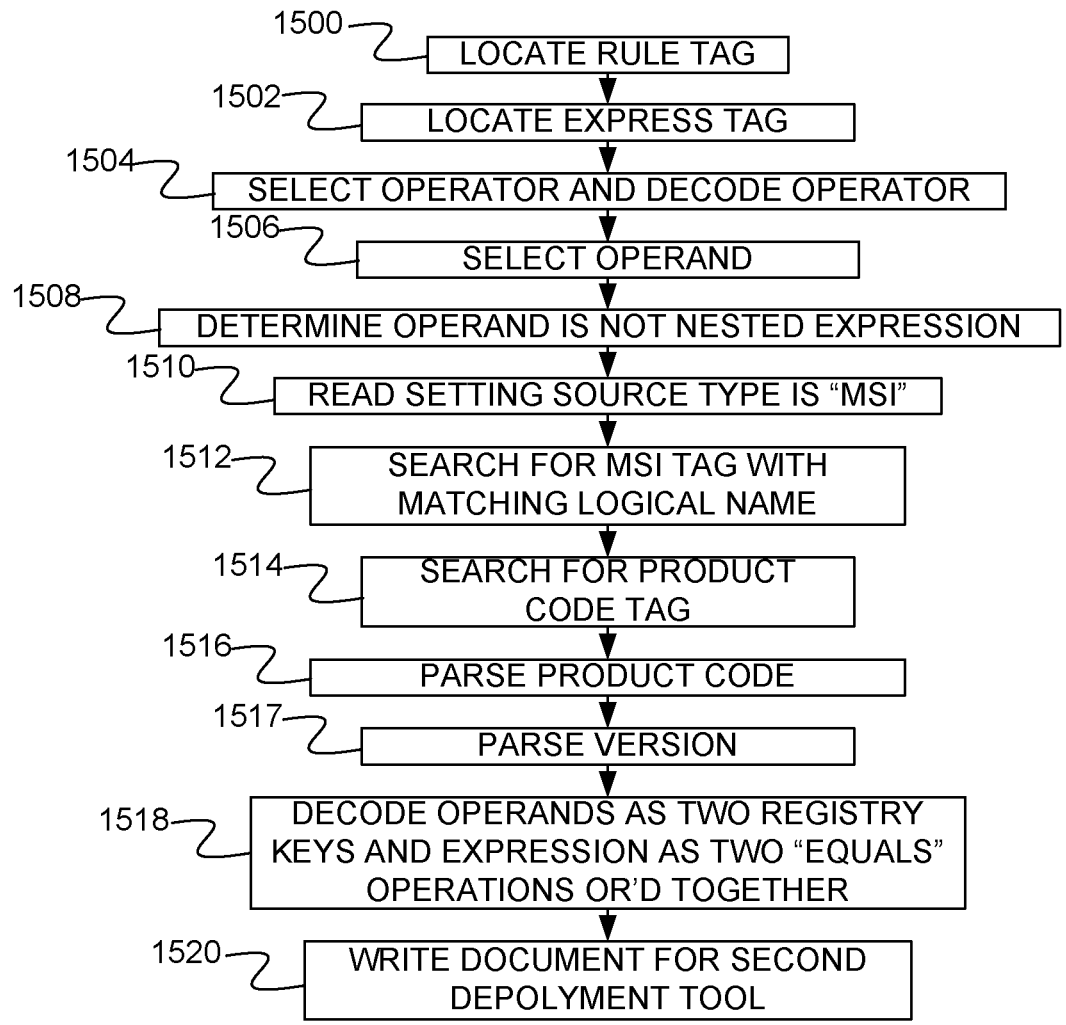
FIG. 15 provides a flow diagram of a method of migrating an encoded version validation rule.

FIG. 15 provides a flow diagram of a method executed by migration tool 104 for decoding a deployment validation rule in a first document 1600 (FIG. 16) provided by first deployment tool 102. The deployment validation rule validates a deployment by determining whether at least one of two registry keys is equal to a particular version value after the deployment. The decoded information is used by migration tool 104 to write a second document 1700 (FIG. 17) in a format needed by second deployment tool 102.

In step 1500, migration tool 104 locates a rule tag 1602 in document 1600. At step 1502, migration tool 104 locates an expression tag 1604 delimited by rule tags 1602. At step 1504, migration tool 104 selects an operator 1606 delimited by expression tag 1604 and decodes operator 1606. In particular, migration tool 104 decodes the operator "Equals" as the operator "Equals".

At step 1506, migration tool 104 selects operand 1608 delimited by operands tag 1610 and determines that operand 1608 is not a nested expression at step 1508. In particular, migration tool 104 determines that operand 1608 is not an expression tag.

At step 1510, migration tool 104 determines the value of the SettingSourceType attribute 1612 of operand 1608. In particular, migration tool 104 determines that attribute 1612 is set to "MSI". Based on this determination, migration tool 104 searches for an MSI tag 1616 that contains a LogicalName attribute 1620 with a value that matches the value of a SettingLogicalName attribute 1614 in operand 1608 at step 1512. At step 1514, migration tool 104 searches for a ProductCode tag 1622 delimited by MSI tag 1616 and reads the corresponding product code 1624 delimited by ProductCode tags 1622 at step 1516.

At step 1517 a version value 1630 is parsed from constant value tag 1628 along with a datatype attribute 1631, which is set to "Version."

At step 1518, migration tool 104 decodes expression 1604 as a Boolean OR of two registry-key-EQUALS-value expressions where the two registry keys are:
HKEY_LOCAL_MACHINE\\SOFTWARE\\Microsoft\\Windows\\CurrentVersion\\Uninstall\\{7952AC-6D-315A-4791-BDE3-0976D6E0AD72}\\ DisplayVersion; and
HKEY_LOCAL_MACHINE\SOFTWARE\Microsoft\\Windows\\CurrentVersion\\Uninstall\\{7952AC6D-315A-4791-BDE3-0976D6E0AD72}\\DisplayVersion
and both registry key values are compared to version value 1630.

Note that document 1600 does not indicate that expression 1604 represents a Boolean OR operation, does not indicate that expression 1604 represents a registry key validation, and does not indicate that expression 1604 represents two registry key value validations. Thus, document 1600 encodes or obscures the data validation rule. As such, during decoding of document 1600, migration tool 104 must construct deployment parameters missing from document 1600 including the registry keys, the EXISTS operations and the Boolean OR operation, for example.

At step 1520, migration tool 104 writes the validation rule represented by document 1600 as document 1700, which is in the correct format for second deployment tool 106. In document 1700, the logical OR operation of expression 1604 is represented by the key/value pair "andFlag": false 1702. The operands of Boolean OR expression 1604 are written as subgroups 1704 and 1706 within "subgroups" key 1708 and each represent a separate registry-key-Equals-value validation. Subgroups 1704 and 1706 include respective "filter" keys 1710 and 1720, which both use a respective "field" key 1712, 1722 to indicate that this is a registry key validation, a respective "value" key 1714, 1724 to designate the respective registry key, a respective "operator" key 1716, 1726 to indicate that this is an Equals expression, and a respective "secondValue" key 1718, 1728 that provides the version value that the registry keys are to be compared against.

Figure 18:
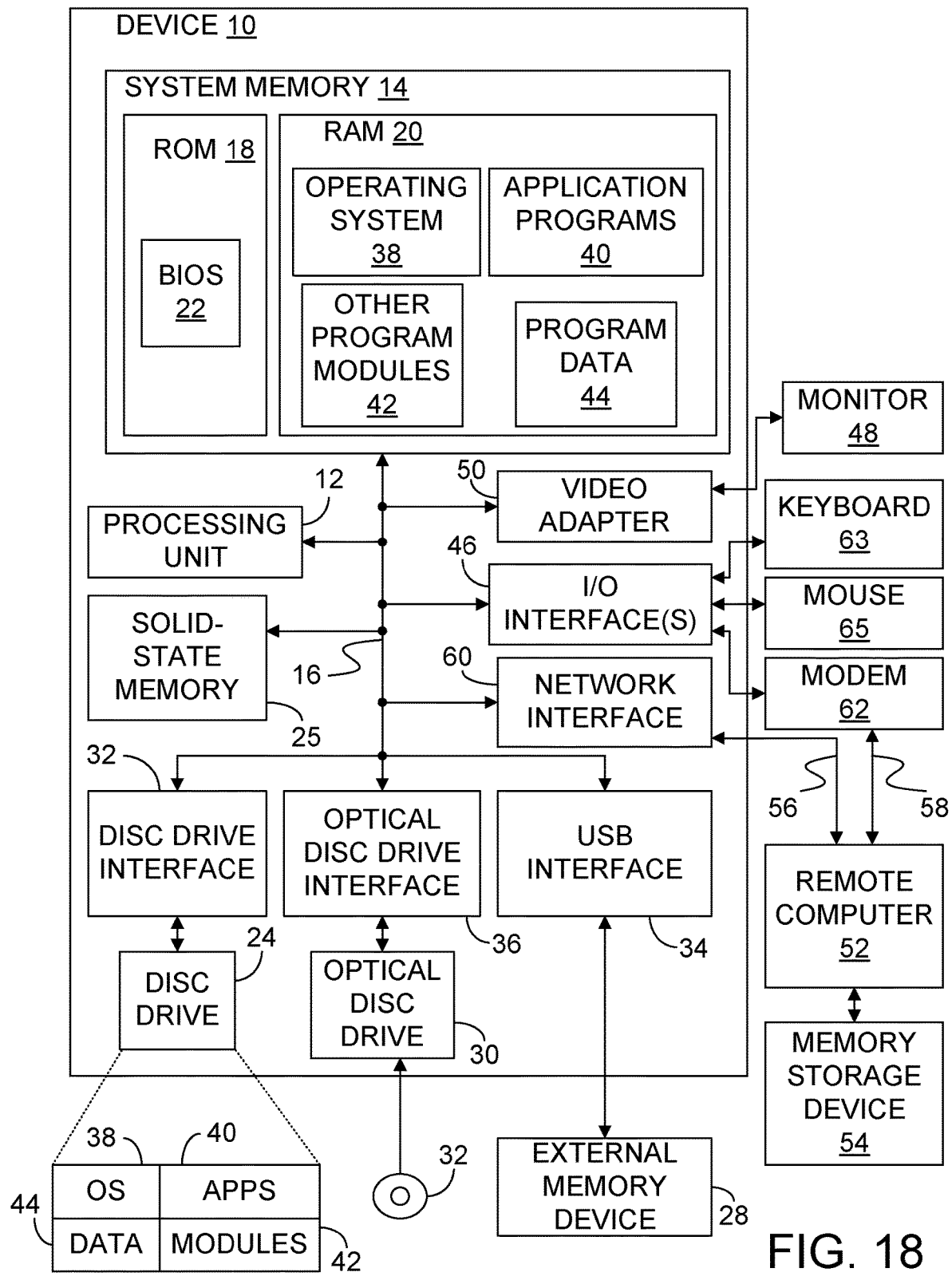
FIG. 18 is a block diagram of a computing system that is used to implement the various embodiments.

FIG. 18 provides an example of a computing device 10 that can be used to implement the migration tool discussed above. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Computing device 10 further includes an optional hard disc drive 24, an optional external memory device 28, and an optional optical disc drive 30. External memory device 28 can include an external disc drive or solid-state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing the migration tool discussed above. Program data 44 may include any data used by the systems and methods discussed above.

Processing unit 12, also referred to as a processor, executes programs in system memory 14 and solid-state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 18. The network connections depicted in FIG. 18 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 18 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
a processor migrating a deployment validation rule from a first deployment tool to a second deployment tool through steps comprising:
decoding a first document output by the first deployment tool, the first document obscuring at least part of the deployment validation rule that is performed during validation of a deployment performed by the first deployment tool, the decoding comprising constructing a deployment parameter used during validation of the deployment performed by the first deployment tool but missing from the first document;
creating a second document using the constructed deployment parameter;
submitting the second document to the second deployment tool to load the deployment validation rule into the second deployment tool; and
parsing the first document to identify a Boolean expression that forms the deployment validation rule,
wherein:
creating the second document comprises representing the Boolean expression in a different format in the second document than in the first document, and
the deployment parameter missing from the deployment validation rule comprises a registry key and a Boolean operation.

2. The computer-implemented method of claim 1 wherein the second document has a different format from the first document.

3. The computer-implemented method of claim 1 wherein the deployment parameter missing from the deployment validation rule comprises an EQUALS operation.

4. A system comprising:
a processor;
a first deployment tool running by the processor having stored therein deployment settings for a plurality of applications, wherein the deployment settings comprise deployment validation rules;
a second deployment tool running by the processor; and
a migration tool running by the processor for migrating a deployment validation rule from the first deployment tool to the second deployment tool by;
receiving a first document from the first deployment tool that describes the deployment validation rule for an application in a format that encodes a portion of the deployment validation rule such that a parameter used during validation of a deployment by the first deployment tool is missing from the first document,
applying decoding rules to the encoded portion of the deployment validation rule to construct the parameter used during validation of a deployment by the first deployment tool and missing from the first document,
writing the parameter to a second document, and
uploading the second document to the second deployment tool to load the validation rule for the application into the second deployment tool,
wherein:
the encoded portion of the deployment validation rule indicates that the deployment rule requires a check of a registry entry,
the migration tool further parses the first document to identify a Boolean expression that forms the deployment validation rule, and
writing the parameter of the deployment validation rule to the second document comprises representing the Boolean expression in a different format in the second document than in the first document.

5. The system of claim 4 wherein the encoded portion of the deployment validation rule indicates that the deployment rule requires a check of a file path.

6. The system of claim 4 wherein the second document has a different format from the first document.

7. The system of claim 4 wherein the migration tool further parses parameters for deploying the application from the first document and writes the parameters for deploying the application to the second document.

8. A computer-implemented method comprising:
migrating a deployment validation rule from a first deployment tool used to deploy an application to devices to a second deployment tool used to deploy the application to devices through steps comprising:
receiving encoded deployment parameters for the validation rule in a first format from the first deployment tool, wherein a parameter of the validation rule used by the first deployment tool is missing in the encoded deployment parameters;
decoding the encoded deployment parameters to produce decoded deployment parameters that include the missing parameter;
writing the decoded deployment parameters including the missing parameter in a second format and uploading the decoded deployment parameters including the missing parameter in the second format to the second deployment tool,
wherein:
a deployment validation rule type is decoded from the encoded deployment parameters in the first format,
the deployment validation rule type comprises a registry key validation,
a Boolean expression for a validation rule is decoded from the encoded deployment parameters in the first format, and
a Boolean expression in the second format is uploaded to the second deployment tool, wherein the Boolean expression in the second format represents the same logic the Boolean expression in the first format.

9. The computer-implemented method of claim 8 wherein the deployment validation rule type comprises a folder path validation.

* * * * *